United States Patent [19]

Izukawa et al.

[11] Patent Number: 4,727,276
[45] Date of Patent: Feb. 23, 1988

[54] DRIVING CIRCUIT FOR VIBRATION WAVE MOTOR

[75] Inventors: Kazuhiro Izukawa, Yokohama; Kho Ishizuka, Kawasaki, both of Japan

[73] Assignee: Canon Kabushiki Kaisha, Tokyo, Japan

[21] Appl. No.: 843,595

[22] Filed: Mar. 25, 1986

[30] Foreign Application Priority Data

Mar. 26, 1985 [JP] Japan ................................. 60-62838
Jun. 25, 1985 [JP] Japan ............................... 60-138307

[51] Int. Cl.⁴ ........................................... H01L 41/08
[52] U.S. Cl. .................................... 310/316; 310/323; 310/328
[58] Field of Search ............... 310/316, 317, 319, 323, 310/328; 318/116, 118

[56] References Cited

U.S. PATENT DOCUMENTS 4,484,099 11/1984 Kawai et al. ................... 310/328 X
4,510,411 4/1985 Hakamata et al. .................. 310/316

Primary Examiner—Mark O. Budd
Attorney, Agent, or Firm—Fitzpatrick, Cella, Harper & Scinto

[57] ABSTRACT

A driving circuit for a vibration wave motor, in which a periodic voltage is supplied to electromechanical energy converting elements generates a travelling vibration wave in a vibrating member, thus causing a relative movement between the vibrating member and a movable member. For achieving effective operation of the vibration wave motor, the driving circuit controls the amplitude of the periodic voltage supplied to the electromechanical converting elements according to the drive state of the vibration wave motor.

4 Claims, 21 Drawing Figures

DRIVING CIRCUIT FOR VIBRATION WAVE MOTOR

BACKGROUND OF THE INVENTION

1. Field of the Invention

The present invention relates to a so-called vibration wave motor, in which a travelling vibration wave is generated in a vibrating member to cause friction drive of a movable member maintained in contact with said vibrating member, and in particular to a driving circuit therefor.

2. Related Background Art

FIG. 1A schematically illustrates a known vibration wave motor, wherein provided are electromechanical energy converting elements $1a$, $1b$ such as electrostriction elements or magnetostriction elements, composed of foe example, lead zirconium titanate (PZT) which are adhered to a vibrating member 2, composed of an annular elastic plate. The vibrating member 2, together with the electrostriction elements $1a$, $1b$, is supported by an unrepresented stator. A movable member 3 constitutes, in this example, an annular rotor, maintained in contact with the other side of the vibrating member 2. The electrostriction elements are arranged along the periphery of the vibrating member 2 in such a manner that those $1a$ of a group are displaced by $\frac{1}{4}$ of the wavelength $\lambda$ of the vibration wave, with respect to those $1b$ of the other group. The electrostriction elements $1a$, $1a$, $1a$, ... of a group are arranged with a pitch equal to $\frac{1}{2}$ of said wavelength, in such a manner that the immediately neighboring elements have mutually opposite polarities. The arrangement is also the same for the elements of the other group.

In the vibration wave motor of the above-explained structure, an AC voltage $V_0 \sin \omega T$ is supplied to the electrostriction elements of a group while an AC voltage $V_0 \cos \omega T$ of those of the other group, whereby said electrostriction elements cause extending-shrinking vibrations in such a manner that the phases thereof are inverted between the neighboring elements and are displaced by 90° between two groups. These vibrations are transmitted to the vibrating member 2 to induce a bending vibration therein according to the pitch of the electrostriction elements $1a$, $1b$ in such a manner that the vibrating member is projected at every other element while it is retracted at the positions of every other remaining element. Since the elements $1a$ of a group are displaced by $\frac{1}{4}$ of the wavelength with respect to those $1b$ of the other group, the bending vibration proceeds along the arrangement of the electrostriction elements. During the application of the AC voltages, vibrations are generated in succession and propagate along the periphery of the vibrating member 2 as progressive bending vibration waves, thus inducing a movement of the movable member 3.

FIG. 1B shows a state in which a vibration detecting element $1c$ is provided on the vibrating member 2.

The electrostriction elements $1a$, $1b$ are provided, on the front and rear faces thereof, with unrepresented electrodes for applying the AC voltages.

FIG. 2 shows a driving circuit for such a vibration wave motor, wherein provided a power supply 10; an oscillator unit 11; a 90° phase shifter unit 12; operational amplifiers OP1, OP2; resistors R1–R4; a capacitor C1; and electrostriction elements $1a$, $1b$ shown in FIG. 1.

The above-explained driving circuit functions in the following manner. In the oscillator unit 11, the voltage $V+$ at the positive input terminal is the operational amplifier OP1 is obtained by dividing the output voltage $V_{out}$ of the operational amplifier OP1 with the resistors R2, R3:

$$V+ = \{R3/(R2+R3)\} \cdot V_{out} \quad (1).$$

On the other hand, the voltage $V-$ at the negative input terminal of the operational amplifier OP1 is obtained by dividing said output with the resistor R1 and the impedance z of the electrostriction element $1a$:

$$V- = \{z/(z+R1)\} \cdot V_{out} \quad (2).$$

The impedance z of the electrostriction element varies according to the vibrating frequency f, as shown in FIG. 3, wherein fr is the resonance frequency and fa is the antiresonance frequency. By differentiating the equation (2) with f, there can be obtained:

$$\frac{dV-}{df} = \frac{dz}{df} \cdot \frac{R1}{(z+R1)^2} \quad (3)$$

Consequently the voltage difference $V_{in} = (V+) - (V-)$ of the input terminal voltages varies in the following manner according to the frequency f:

| f | <fr | fr | fr< |
|---|---|---|---|
| dz/df | — |  | + |
| dV−/df | — |  | + |
| V− | decrease | $z/(z+R1)$ | increase |
| $V_{in}$ | increase | $\frac{R3}{R2+R3} - \frac{z}{z+R1}$ | decrease |

As will be seen in this table, the input voltage difference $V_{in}$ reaches a maximum at the resonance frequency fr of the electrostriction element. Thus, the resistors R1–R3 are so determined as to satisfy the above-mentioned relation. The Q factor in this state is equal to $A_0 \cdot Q_0$ wherein $Q_0$ is the Q factor of the electrostriction element, and $A_0$ is the amplification factor of the operational amplifier OP1.

In the 90° phase shifter unit 12, an integrating circuit composed of the operational amplifier OP2, resistor R4 and capacitor C1 supplies the output AC voltage of the operational amplifier, with a delay in phase of 90°, to the electrostriction elements $1b$.

In such circuit, the output voltage of the operational amplifier OP1 approaches the voltage of the power supply 10, eventually giving rise to a distortion in the driving sinusoidal waveform, due to fluctuation in the impedance z of the electrostriction elements $1a$ caused by changes in the internal or external temperature etc., though such behavior depends on the response of the operational amplifier OP1.

Such distortion in the waveform increases high-order components, such as second and third order components, of the resonance frequency. Such high-order components scarcely contribute to the drive but induces unnecessary vibration, thus decreasing the output power of the motor and reducing the efficiency thereof.

Also, there are drawbacks such as fluctuations in the revolution of the motor in a sudden change in the event the load or insufficient torque at the start-up.

SUMMARY OF THE INVENTION

A first object of the present invention is to prevent presence of high-order frequency components in the driving electrostriction elements, caused by the saturation of output of the driving periodic voltage in the conventional driving circuit for vibration wave motors, thereby realizing a drive with undistorted sinusoidal wave. This object can be achieved through the use of a gain control circuit which, in the course of drive, detects the output status of said periodic voltage and controls the gain thereof in response to the result of said detection, thereby eliminating the high-order frequency components in the AC voltage supplied to the electromechanical energy converting elements for driving the vibration wave motor, and of a circuit which, at the initial stage of motor drive, supplies high-order frequency components for facilitating the start-up operation.

A second object of the present invention is to compensate for any fluctuations in the revolution of the vibration wave motor in the event that the revolution is intentionally changed or in the event of a change in the load thereof. This object can be achieved by the use of a voltage control circuit which detects the motor revolution and accordingly controls the voltage of a power supply unit, supplying the periodic voltage to the driving electromechanical energy converting elements.

Still other objects of the present invention will become fully apparent from the following description.

DETAILED DESCRIPTION OF THE PREFERRED EMBODIMENTS

In the following there will be explained a control circuit, for controlling the periodic voltage supplied to the electrostriction elements.

Figure 2:
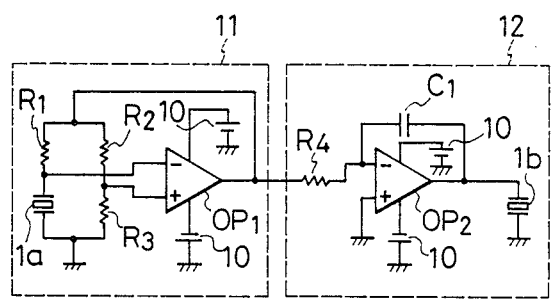
FIG. 2 is a circuit diagram showing the conventional driving principle of the vibration wave motor shown in FIG. 1.
Figure 4A:
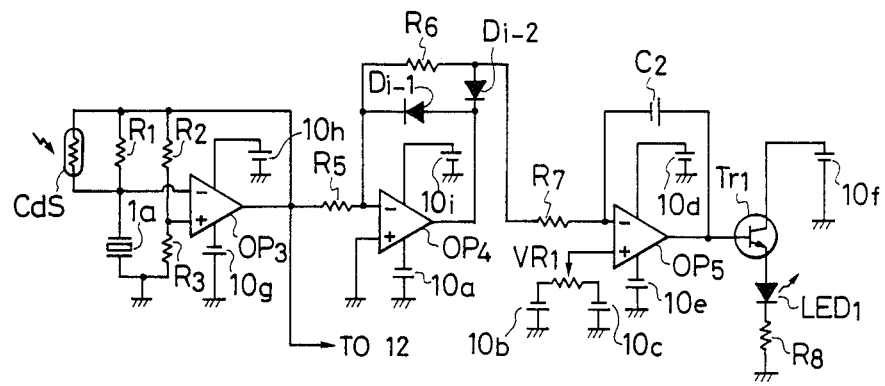
FIGS. 4A and 4B are circuit diagrams showing a first embodiment of the gain control of the present invention.

FIG. 4A shows a driving circuit constituting a first embodiment of the present invention, wherein provided are a variable resistor CdS composed of cadmium sulfide and showing a variable resistance according to the amount of received light; operational amplifiers OP3, OP4, OP5; resistors R1, R2, R3, R5, R6, R7, R8; diodes Di1, Di2; a capacitor C2; a variable resistor VR1; a transistor Tr1 and a light-emitting diode LED1. The circuit shown in FIG. 4A corresponds to the oscillator 11 in FIG. 2. The operational amplifier OP3 corresponds to that in the oscillator unit 11 in FIG. 2, an variable resistor CdS is connected in parallel with the resistor R1.

The operational amplifier OP4, resistors R5, R6 and diodes D1, D2 constitute an ideal diode half-wave rectifying circuit.

The operational amplifier OP5, resistor R7 and capacitor C2 constitute an integrating circuit.

The output of the oscillator circuit is supplied through the half-wave rectifying circuit, and is converted to a DC voltage by the integrating circuit. The transistor Tr1 is driven by the difference between a voltage set by the variable resistor VR1 and the output voltage of the half-wave rectifying circuit. Thus, in case the output voltage of the oscillator unit becomes large and saturated, the integrating circuit releases a large output to increase the base current of the transistor Tr1, whereby the emitter current is increased to increase the amount of light emitted by the light-emitting diode LED1. In response, the resistance of the variable resistor CdS reduces the amplification factor of the oscillator unit, thereby decreasing the output supplied to the phase shifter unit shown in FIG. 2. In this manner it is possible to prevent any unnecessary vibration and to avoid a loss in the efficiency of the vibration wave motor, caused by high-order frequency components resulting from a saturation of the output of the oscillator circuit.

In the above-explained circuit, the oscillation frequency changes when the light from the light-emitting diode LED1 enters the variable resistor CdS connected parallel to with the resistor in the oscillator circuit. Such a change in the oscillation frequency can however be prevented by a structure shown in FIG. 4B in which a circuit composed of an operational amplifier OP6, the variable resistor CdS and a resistor R13 is inserted between the output of the operational amplifier OP3 and the resistor R5.

Figure 4B:
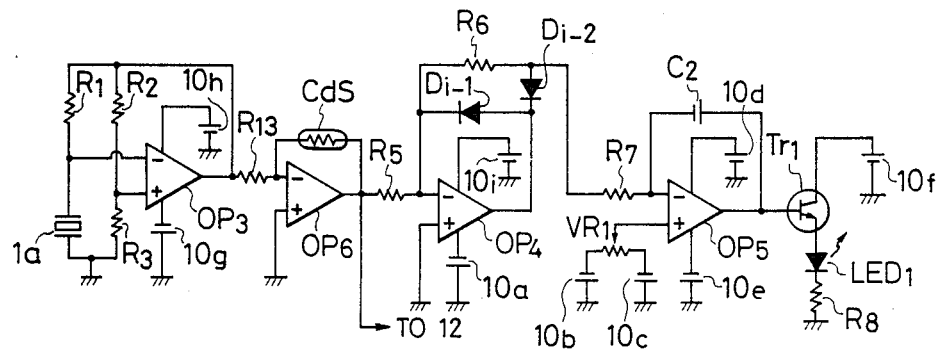
Figure 5:
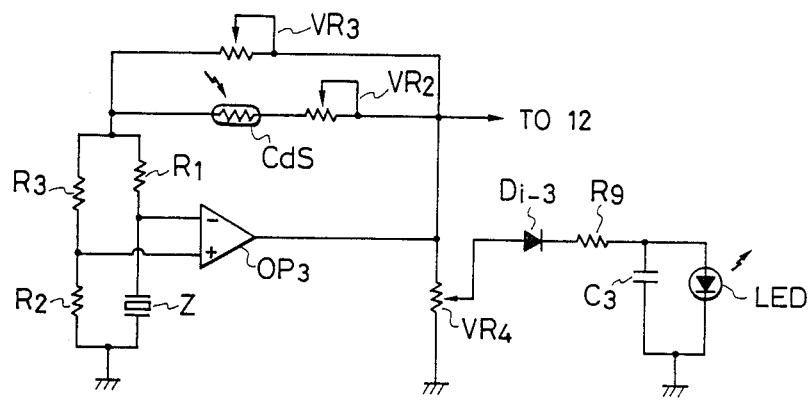
FIG. 5 is a circuit diagram showing a second embodiment of the gain control of the present invention.

Now reference is made to FIG. 5, showing a second embodiment of the present invention, wherein the same components as those shown in FIGS. 4A and 4B are represented by the same numbers or symbols.

The circuit shown in FIG. 5 further comprises variable resistors VR2, VR3, VR4; a capacitor C3; and a resistor R9. In contrast to the embodiment shown in FIG. 4A in which the resistor CdS is parallel with the resistor R1, the embodiment shown in FIG. 5 has a circuit, composed of the resistor CdS and variable resistors VR2, VR3, in the feedback path of the operational amplifier OP3.

In this embodiment, when the output of the oscillator, half-wave rectified by the variable resistor VR4 and diode Di3 increases to saturation, the voltage across the capacitor C3 constituting the integrating circuit is increased to emit a larger amount of light from the light-emitting diode LED, whereby the resistance of the variable resistor CdS is decreased to reduce the amplification factor of the oscillator circuit, thus decreasing the output. It is therefore possible to prevent unnecessary vibration of the motor, caused by the high-order frequency components generated at the saturation of the oscillator, thereby avoiding a loss in the efficiency of the motor.

Also in this embodiment employing an integrating circuit composed of the capacitor C3 and resistor R9, in a determined period after the start of power supply to the driving circuit until the voltage across the capacitor C3 becomes high enough to emit a large amount of light from the light-emitting diode LED, the CdS has a high resistance to provide a high amplification factor in the oscillator circuit, whereby the output thereof is saturated to generate square waves. On the other hand, the vibration wave motor requires a large energy at the start-up because the movable member and the vibrating member may stick to each other at the contact surface therebetween. In such conditions, a square wave is desirable for driving the motor. Also the use of a square wave, including a wider frequency range, facilitates the start-up. Consequently, the present embodiment allows to facilitates the start-up of the vibration wave motor and prevents unnecessary vibration once the stable operation of the motor is started.

Such method of using square waves in the initial stage of the drive and then avoiding the unnecessary vibration once the drive is started can be employed regardless of the kind of driving circuit, for example in the MOPA method employing a main oscillator, an auto-oscillation method, etc.

Figure 6:
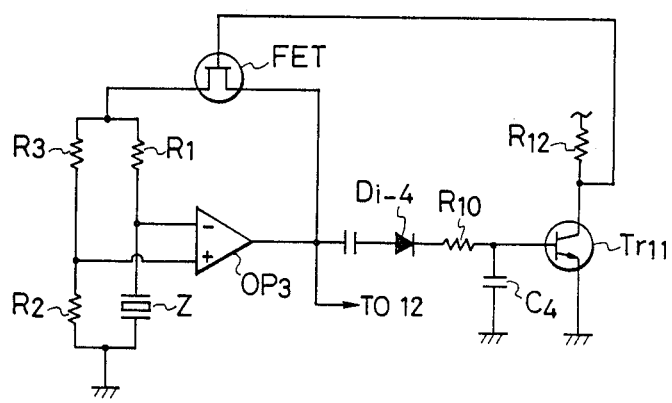
FIG. 6 is a circuit diagram showing a third embodiment of the gain control of the present invention.

In the foregoing embodiments shown in FIGS. 4 and 5, the CdS and light-emitting diode are combined for controlling the amplification factor of the operational amplifier constituting an oscillator. Now reference is made to FIG. 6 in which the amplification factor of an oscillating amplifier is automatically regulated without a CdS and an LED. In FIG. 6 there are provided resistors R10, R12; a capacitor C4 and a diode Di4, and a transistor Tr1 is driven by the output of a filter composed of the resistor R10 and the capacitor C4. In the feedback line of the operational amplifier OP3, there is inserted an FET, of which gate is connected to the collector of the transistor Tr1.

When the output of the operational amplifier OP3 increases, the transistor Tr1 is activated whereby the potential of the collector thereof is lowered. Thus, the gate voltage of the FET is reduced to lower the resistance across the source and drain thereof, whereby the output of the operational amplifier OP3 is reduced and does not reach the saturated state. In this manner the present embodiment provides a simpler structure without an LED or a CdS.

Figure 7A:
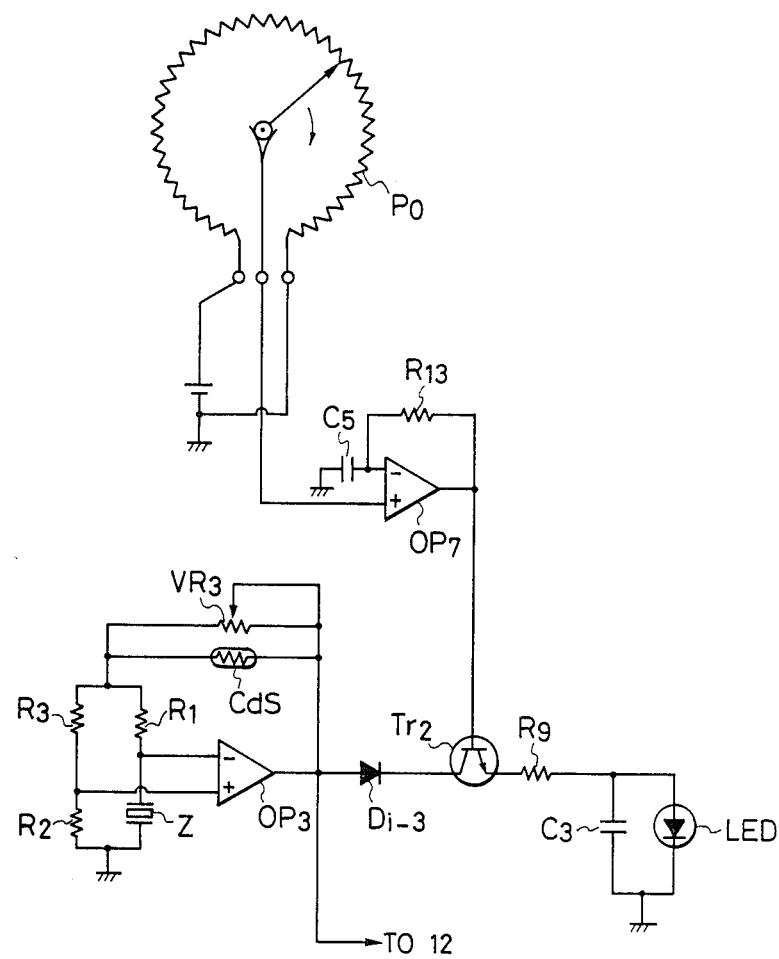
FIGS. 7A, 7B and 7C are circuit diagrams showing a fourth embodiment of the gain control of the present invention.
Figure 7B:
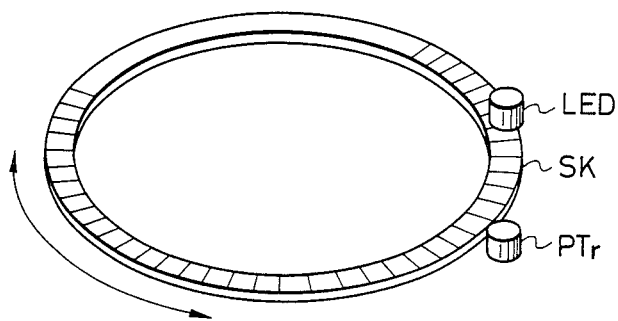
Figure 7C:
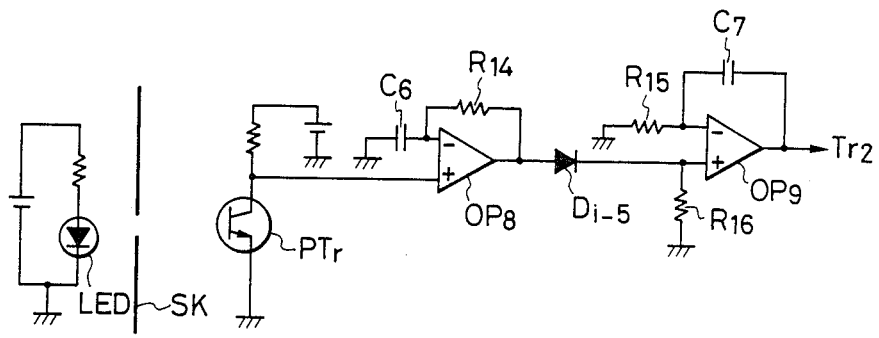

As explained in the foregoing, the embodiments shown in FIGS. 5 and 6 are capable of achieving secure start-up of the vibration wave motor and of automatic gain control by continuous feedback for preventing the saturation of the output of the oscillator unit in the driving circuit Now reference is made to FIGS. 7A, 7B and 7C for explaining another embodiment in which the power is not supplied to the automatic gain control circuit until the vibration wave motor is securely started up, and the driving circuit starts automatic gain control after the motor driving is actually started.

In FIG. 7A there is provided a potentiometer Po, having a brush linked with the rotation of the motor slides on a resistor. There are also provided a capacitor C5 and a resistor R6.

Before the start of the vibration wave motor, an operational amplifier OP7 releases an L-level output to turn off a transistor Tr2, whereby the light-emitting diode LED does not emit light. Thus, the CdS shows a high resistance, so that the oscillator unit provides a saturated output, ensuring start-up operation. After the motor is started, the brush of the potentiometer Po is rotated in a direction indicated by an arrow, whereby the operational amplifier releases an H-level output to turn on the transistor Tr2, thereby emitting light from the light-emitting diode LED. Thus, the CdS shows a lowered resistance to reduce the gain of the oscillator unit. Consequently, the saturation in the output thereof is avoided.

In such embodiment employing the potentiometer Po, operational amplifier OP7, resistor R6 and capacitor C5, it is not possible to detect the state of rotation of the motor if the rotating direction is changed.

FIGS. 7B and 7C show an embodiment allowing secure detection of the state of rotation regardless of the rotating direction of the vibration wave motor.

FIG. 7B is a perspective view of a photointerruptor for detecting whether the motor is actually rotating, and is composed of a scale SK moving together with the movable member, and a fixed light-emitting diode LED and a fixed phototransistor PTr.

FIG. 7C is a circuit diagram for the phototransistor PTr, wherein an operational amplifier OP8, a capacitor C6 and a resistor R14 constitute a differentiating circuit, while a diode Di5, resistors R15, R16, a capacitor C7 and an operational amplifier OP9 constitute an integrating circuit for the component rectified by the diode Di5. The output of the operational amplifier OP9 is supplied to the base of the transistor Tr2 shown in FIG. 7A. Other parts are constructed in the same manner as in FIG. 7A and will not therefore be explained further.

In the embodiment shown in FIG. 7C, if the vibration wave motor is not actually moving, the scale SK remains at a standstill so that the phototransistor PTr receives a constant amount of light. Thus, the differentiating circuit releases a zero output, and the integrating circuit therefore releases an L-level output to turn off the transistor Tr shown in FIG. 7A. On the other hand, if the scale SK is moved by the rotation of the vibration wave motor in either direction, the phototransistor PTr receives a varying amount of light to release a corresponding signal from the differentiating circuit, whereby the output of the integrating circuit becomes higher gradually, thereby eventually turning on the transistor Tr2 shown in FIG. 7A.

The present invention is therefore capable of detecting whether the motor is actually driven regardless of the rotating direction thereof, and does not effect the gain control until the motor is securely driven but performs secure gain control after the motor is stably driven.

The adjustment of the gain level is achieved by the control of the variable resistors VR1, VR2, VR3 and VR4.

As explained in the foregoing, these embodiments are provided with a control circuit for preventing the distortion and saturation in the output of an AC voltage generating circuit for generating the AC voltage for driving the vibration wave motor, thereby preventing unnecessary vibration due to high-order frequency components caused by distortion or saturation of the output of said generating circuit. Also, an improved driving efficiency can be achieved by supplying high-order frequency components to the driving electrostriction elements in the initial stage of drive to facilitate the start-up, and to supply a sinusoidal wave of a determined frequency in the course of motor driving.

The second characteristic of the driving circuit for the vibration wave motor of the present invention lies in the presence of control means for controlling the power supply voltage, connected to the power amplifier for supplying AC voltages to the electromechanical energy converting elements, for example electrostriction elements arranged on the vibrating member of the vibration wave motor.

Such control means is operated in response to the detection output of means for detecting the revolution of the movable member of the motor, thereby achieving a feedback control of the revolution for preventing fluctuation thereof. The control means can also be utilized for increasing the start-up torque of the motor.

Figure 8:
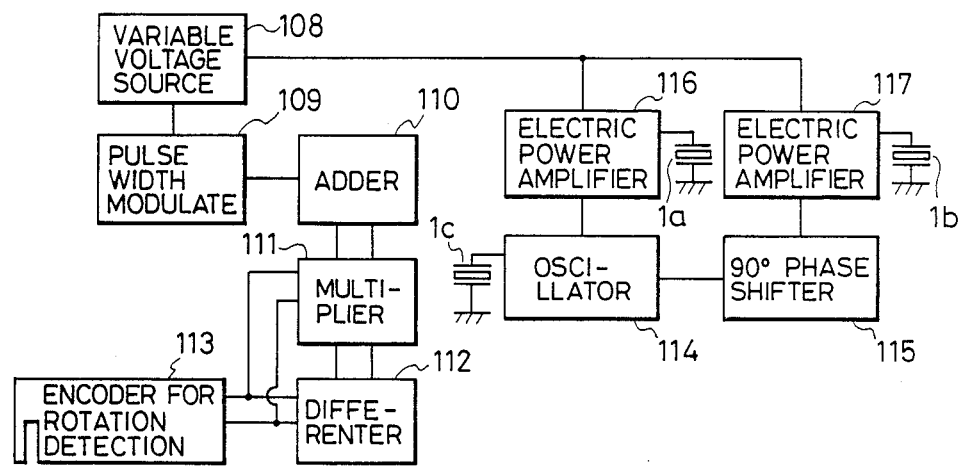
FIG. 8 is a block diagram showing an embodiment of a driving circuit for power supply control of the present invention.

FIG. 8 is a block diagram showing an embodiment of the driving circuit of the present invention, wherein provided are a variable-voltage power supply 108; a pulse width modulator 109; an adder 110; a multiplier 111; a differentiating circuit 112; an encoder 113 for detecting the rotation of the vibration wave motor; an oscillator 114; a 90° phase shifter 115; power amplifiers 116, 117; driving electrostriction elements 1a, 1b respectively driven by said power amplifiers 16, 17; and an electrostriction element 1c for following the resonance frequency for controlling the frequency of the oscillator 114.

Figure 1A:
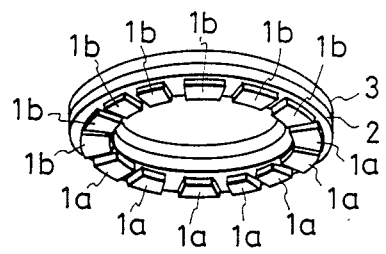
FIGS. 1A and 1B are schematic views of principal parts of a vibration wave motor.
Figure 1B:
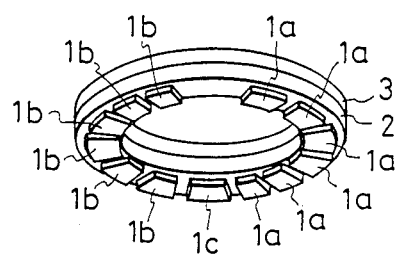

FIG. 1B is a perspective view of a vibration wave motor to which the driving circuit of the present invention is applicable, wherein said electrostriction element 1c for following the resonance frequency converts the force, generated by the vibration of the vibrating member 2, into a voltage. Said voltage depends upon the position of said electrostriction element 1c but has a frequency equal to the resonance frequency of the vibrating member 2, and has a certain phase relationship with the voltages to be supplied to the driving electrostriction elements 1a, 1b. Thus, the voltages to be supplied to said driving electrostriction elements 1a, 1can be obtained by amplification and phase shift of the thus detected voltage. If the electrostriction element 1c for following the resonance frequency is positioned at the same phase as that of the driving electrostriction elements 1a, the phase of the voltage detected from said electrostriction element 1c is displaced by 90° from that of the voltage supplied to the electrostriction elements 1a.

Figure 9:
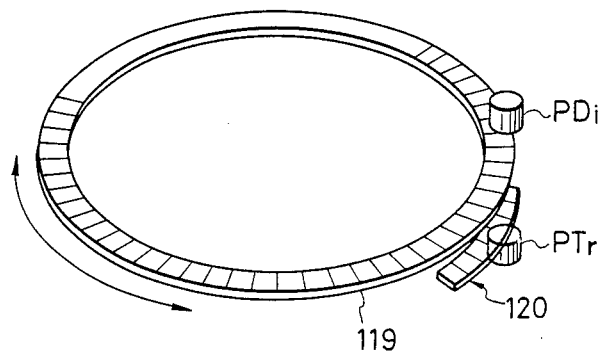
FIG. 9 is a perspective view of a principal part of a revolution detecting encoder employed in the circuit shown in FIG. 8.

The rotation detecting encoder 113 is essentially constructed as shown in FIG. 9. There are provided a main scale 119, and an opposed stationary index scale 120, which are both divided into plural sectors as illustrated. The light from a light-emitting diode PDi enters a phototransistor PTr through the main scale 119 and the index scale 120. The index scale 120 is in a fixed relative position to the phototransistor, while the main scale 119 rotates with the rotating part of the motor. Consequently, the amount of light received by the phototransistor PTr varies substantially as a sine function, depending on the rotational position of the main scale 119.

The direction of rotation is detected from sinusoidal output signals of a phase difference of 90°, obtained by an index scale with slits displaced in phase by 90°.

The sinusoidal output signals from the encoder will be respectively represented as $\sin(\omega_x\theta)$ and $\cos(\omega_x\theta)$, wherein $\omega_x$ represents the number of sectors divided by time, and $\theta$ indicates the rotational position. By differentiating these functions with $\theta$ there are obtained:

$$\omega_x \cos(\omega_x\theta), \ -\omega_x \sin(\omega_x\theta)\theta$$

By multiplying these functions and adding the absolute value of the products in the following manner there can be determined the revolution of the motor:

$$|\sin(\omega_x\theta) \times \{-\omega_x\sin(\omega_x\theta)\}| + |\cos(\omega_x\theta) \times \{\omega_x\cos(\omega_x\theta)\}|$$

$$= \omega_x\{\sin^2(\omega_x\theta) + \cos^2(\omega_x\theta)\}$$

$$= \omega_x.$$

The above-explained calculations are executed by the encoder 113, differentiater 112, multiplier 111 and adder 110.

The signal from the adder 110 determines the pulse width of the pulse width modulator 109, and the output voltage of the variable-voltage power supply 108 is varied according to the pulse width.

On the other hand, in response to the electro-striction element 1c, the oscillator 114 releases an AC signal of the resonance frequency, and the signal is further supplied to the 90° phase shifter 115 to obtain an AC signal of which phase is shifted by 90° with respect to the first-mentioned signal. These AC signals of the resonance frequency, with a mutually phase difference of 90°, respectively drive the power amplifiers 16, 17, of which output voltages are variable according to the voltage supplied by the variable voltage power supply 108. Consequently, the voltages supplied to the driving electrostriction elements 1a, 1b vary according to the output of the power supply 108.

Figure 10:
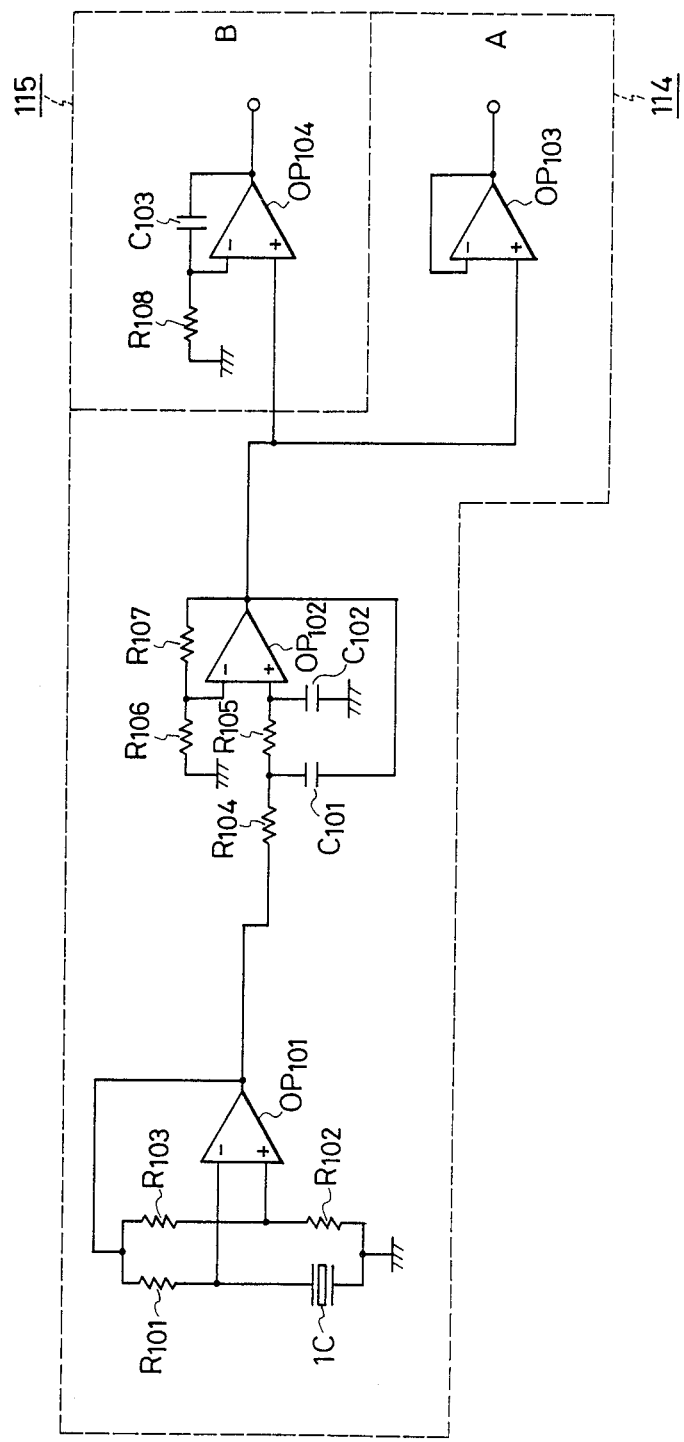
FIGS. 10 and 11 are circuit diagrams showing the details of blocks shown in FIG. 8.

In the following the block diagram shown in FIG. 8 will be explained in further detail. FIG. 10 shows the details of the oscillator 114 and the 90° phase shifter shown in FIG. 8. Also FIG. 11 shows the details of the variable-voltage power supply 108, pulse width modulator 109, adder 110, multiplier 111, differentiating circuit 112, encoder 113 and power amplifiers 116, 117.

In FIG. 10, resistors R101–R103, electro-striction element 1c for following the resonance frequency and an operational amplifier OP101 constitute a bridge oscillating circuit. Resistors R104–R107, capacitors C101, C102 and an operational amplifier OP102 constitute a low-pass filter, and an operational amplifier OP103 constitutes a buffer. These circuits constitute the oscillator 114. Also a resistor R108, a capacitor C103 and an operational amplifier OP104 constitute the 90° phase shifter 115.

Figure 11:
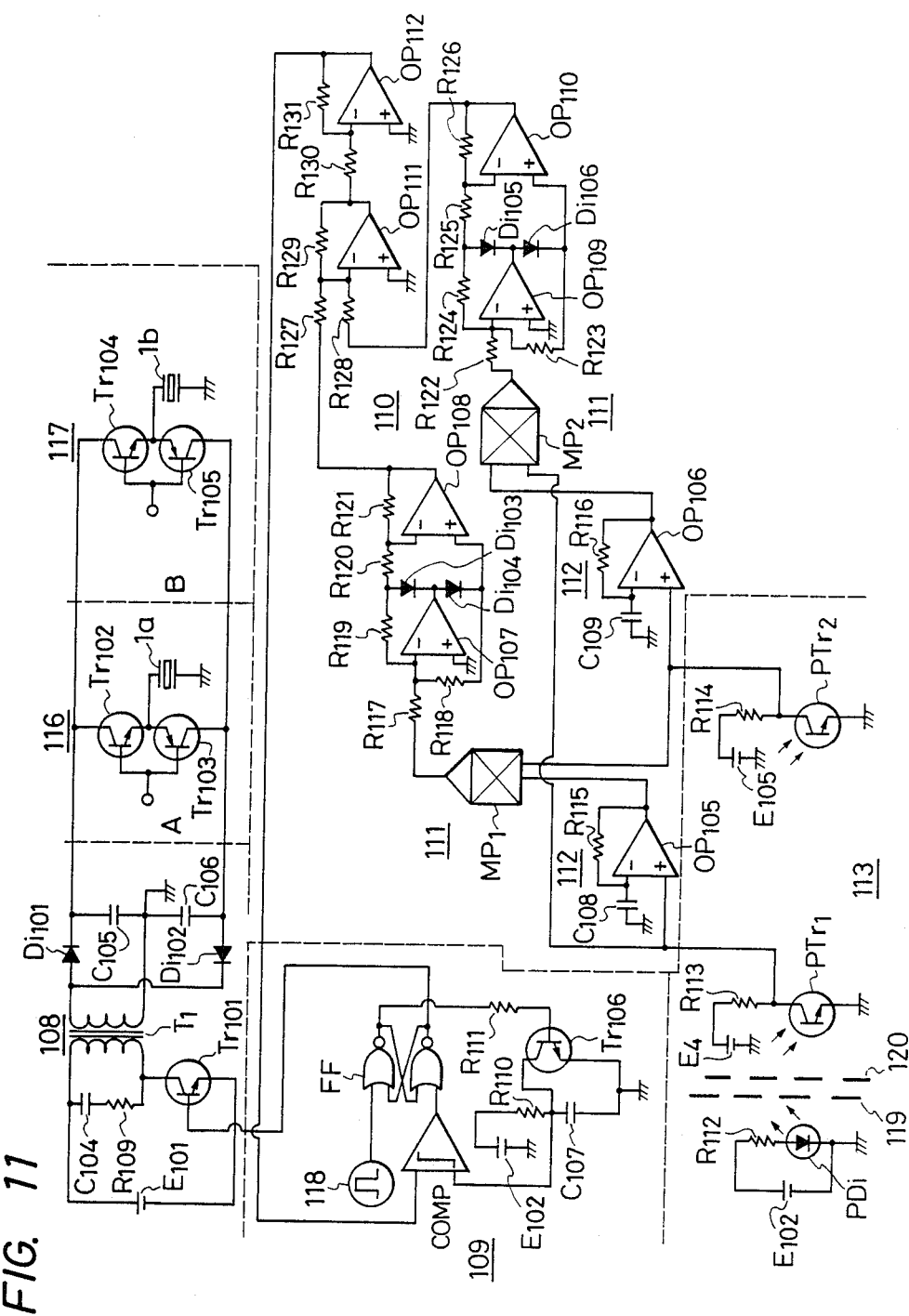

Then, in FIG. 11, a battery E101, capacitors C104–C106, a resistor R109, a transistor Tr101, a transformer T1, and diodes Di101, Di102 constitute the variable-voltage power supply 108.

The pulse width modulator 109 is composed of a pulse generator 118, a flip-flop FF, a comparator COMP, a power supply E2, resistors R110, R111, a capacitor C107 and a transistor Tr106.

The rotation-detecting encoder 113 is composed of a main scale 119, an index scale 120, power supplies E10-

3-E105, resistors R112-R114, a light-emitting diode PD1 and phototransistors PTr1, PTr2. Light-emitting diode and scales for the phototransistors PTr2 are omitted from the illustration. The phototransistors PTr1, PTr2 respectively release the aforementioned signals $\sin(\omega_x \theta)$ and $\cos(\omega_x \theta)$.

Two differentiating circuits 112 are composed of capacitors C108, C109, resistors R115, R116 and operational amplifiers OP105, OP106.

Two multipliers 111 are composed of multiplying circuits MP1, MP2.

Resistors R117-R126, diodes Di103-Di106, and operational amplifiers OP107-OP110 constitute two absolute value circuits, of which outputs are supplied to an adding circuit composed of resistors R12-R129 and an operational amplifier OP111. Since the adding circuit performs an inverted amplification, there is provided an inverting amplifier composed of resistors R130, R131, and an operational amplifier OP112. The above-mentioned absolute value circuits, adding circuit and inverting amplifier constitute the adder 110 shown in FIG. 8.

The power amplifier 16 is composed of transistors Tr102, Tr103, and the power amplifier 17 is composed of transistors Tr104, Tr105. These power amplifiers are B- or C-class push-pull amplifiers.

Figure 12A:
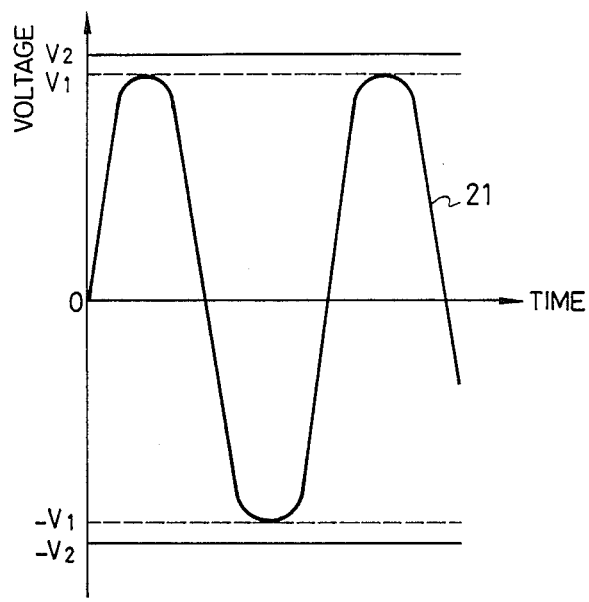
FIGS. 12A, 12B and 12C are charts showing the function of the embodiments of the present invention.

FIG. 12A shows the sinusoidal output waveform of the B-class push-pull amplifier, wherein $\pm V_2$ indicates the power supply voltage, and 21 indicates the output voltage waveform, with a peak value $V_1$ close to $V_2$. The losses in the transistors are disregarded. If a fluctuation, for example an increase, in the revolution of the vibration wave motor, caused for example by a change in the load, is compensated by reducing the AC voltage supplied to the electrostriction elements 1a, 1b in response to the signal from the encoder 113, there will result an undesirable power loss in the power amplifiers. The situation is the same in the case of the C-class amplifiers.

Figure 12B:
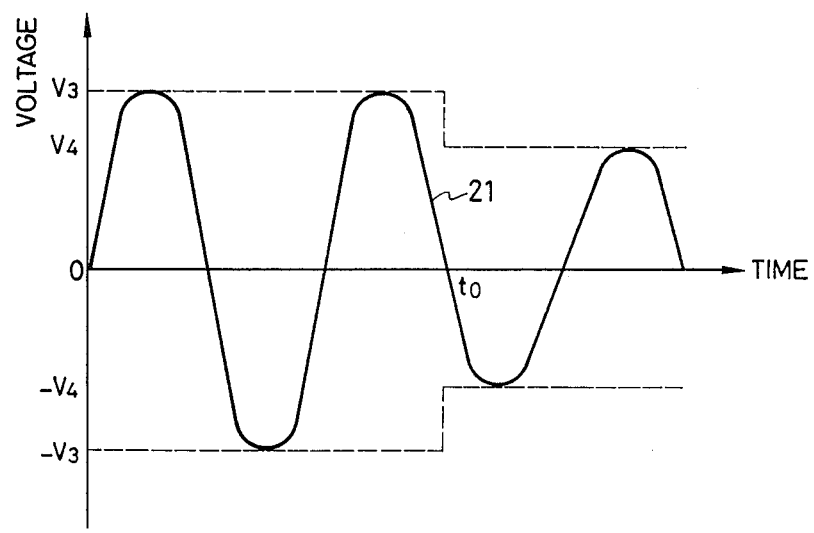
Figure 12C:
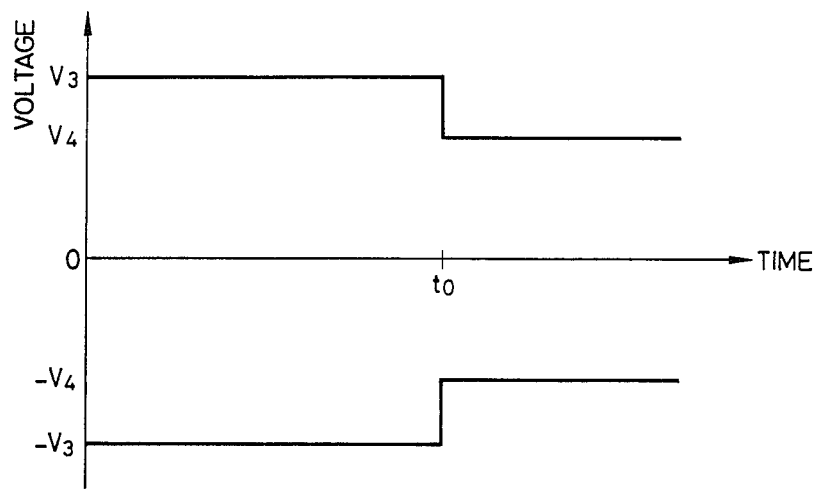

In consideration of the foregoing, the fluctuation in the revolution of the vibration wave motor, caused for example by a change in the load, can be compensated in the present embodiment in the following manner. Let us assume that, as shown in FIG. 12B, the output voltage 21 of the power amplifiers 116, 117 should be changed from $V_3$ to $V_4$ at a timing $t_0$, in response to a signal detected by the revolution detecting means including the encoder 113, in order to maintain a constant revolution. For this purpose, in the present embodiment, a change in the width of the pulses emitted from the pulse width modulator 109 in response to the above-mentioned signal control the level of power supply of the variable-voltage power supply 108 to regulate the power supply voltage to said power amplifiers 116, 117 as shown in FIG. 12C, thereby realizing a change in the output of said power amplifiers as shown in FIG. 12B. In this manner, the loss in the power amplifiers can be reduced.

Figure 13:
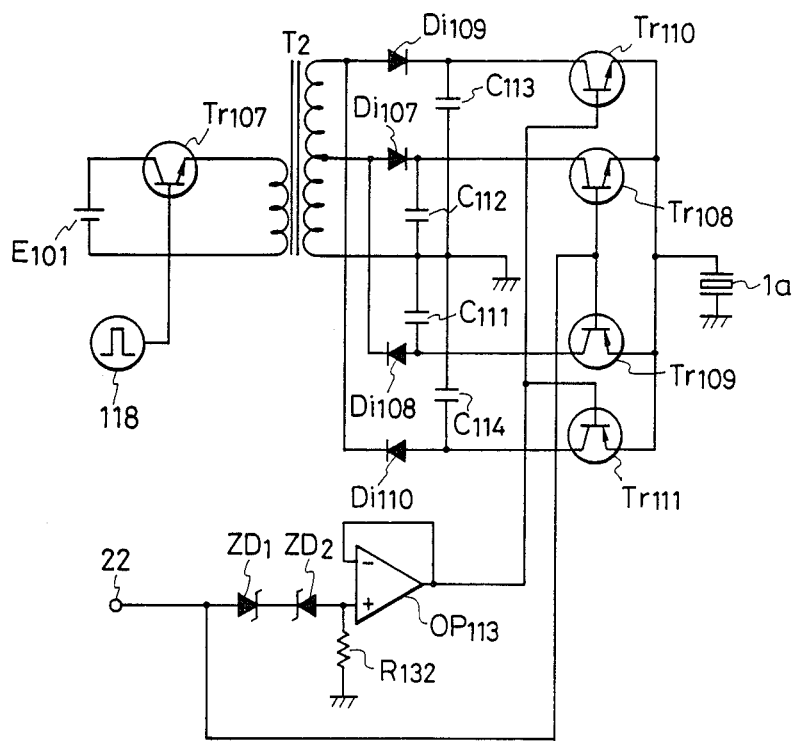
FIG. 13 is a circuit diagram showing a second embodiment of the power supply control of the present invention.

FIG. 13 shows another embodiment of the present invention, wherein provided are a power supply E101; a pulse generator 118; transistors Tr107-Tr111; diodes Di107-Di110; capacitors C110-C113; driving electrostriction elements 1a; Zenar diodes ZD1, ZD2; an operational amplifier OP113; and a resistor R132. A similar circuit is provided also for the driving electrostriction elements 1b.

In FIG. 13, the DC voltage from the battery E101 is converted into an AC voltage by the transistor Tr107 driven by the pulse generator 118. The AC voltage is elevated by a transformer T2 into different AC voltages. These two AC voltages are respectively rectified by the diodes Di107, Di108, capacitors C112, C111 and by the diodes Di109, Di110, capacitors C112, C113 to provide two DC voltages, which can be employed as the power supply voltages $\pm V_2$ and $\pm V_4$ shown in FIG. 12C.

In this embodiment, the voltage of the resonance frequency is supplied to an input terminal 22. If the voltage is low, a limiter circuit, composed of the operational amplifier OP113, Zener diodes ZD1, ZD2 and resistor R132 does not provide an output, so that the transistors Tr108 and Tr109 alone are activated. In this state, the lower voltage $\pm V_4$ is supplied to the electrostriction elements 1a. On the other hand, if said voltage of the resonance frequency supplied to the input terminal 22 becomes high, said limiter circuit is activated to turn on the transistors Tr110, Tr111, whereby the higher voltage $\pm V_3$ is supplied to the electrostriction elements 1a. In this manner, two voltages can be efficiently obtained.

Figure 14:
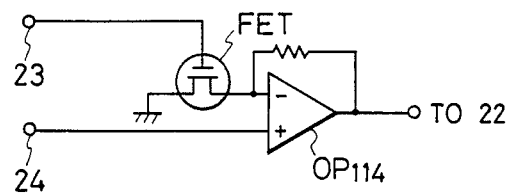
FIGS. 14 and 15 are circuit diagrams showing examples of a signal supply circuit to a terminal 22 shown in FIG. 9.

FIG. 14 shows an example of the circuit for supplying a voltage to the input terminal 22 shown in FIG. 13 for compensating for the fluctuation in the rotation of the vibration wave motor, wherein a terminal 23 receives the output of the operational amplifier OP112 shown in FIG. 11, while a terminal 24 receives the output of the terminal A shown in FIG. 10, and the output of an operational amplifier OP114 is supplied to the input terminal 22 shown in FIG. 13. A field-effect transistor FET performs an automatic gain control function as the resistance thereof is reduced when the gate voltage thereof is elevated. Thus, the output of the operational amplifier OP112 shown in FIG. 11 is utilized as the gate votage of FET, so that the gain is increased when the voltage is elevated. In this manner, any fluctuation in the revolution of the vibration wave motor can be compensated.

Figure 15:
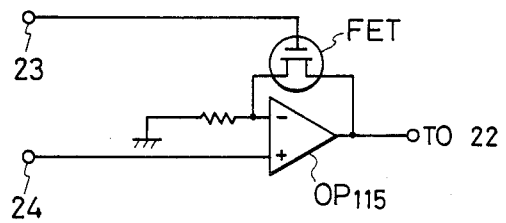

FIG. 15 shows an example of the circuit for supplying a voltage to the input terminal 22 shown in FIG. 13, for increasing the start-up torque of the motor, wherein a gate voltage of an FET is elevated only in the start-up of the motor. In FIG. 15, a terminal 23 receives the output of the operational amplifier OP112 shown in FIG. 11, while a terminal 24 receives the output of the terminal A shown in FIG. 10, and the output of an operational amplifier OP115 is supplied to the input terminal 22 shown in FIG. 13. The gain is high in the absence of the signal indicating the rotating speed of the motor, but is reduced in response to the signal.

In the foregoing explanation there are employed two voltage levels, but the present invention is not limited to such embodiments. Also the electrostriction elements explained before may naturally be replaced by magnetostriction elements or the like.

As explained in the foregoing, the present embodiment is featured by the presence of a control circuit capable of controlling the voltage level supplied to the electrostriction elements for the purpose of controlling the revolution in the event of a change in the load or in the event of start-up of the motor, thereby preventing any unevenness in the motor rotation and to easily obtain a higher torque, for example, at the starting of the motor.

Further, voltage sources are provided in the driving circuit which may be different from each other in their characteristics.

What is claimed is:

1. A driving circuit for a vibration wave motor in which periodic signals are supplied to electromechanical energy converting elements to generate a travelling wave on a vibrating member thereby driving a movable member by means of said travelling wave, comprising:
   (a) first detection means for detecting the vibration on said vibrating member;
   (b) periodic signal regulating means for forming said periodic signals in the form of sinusoidal waves of a determined frequency according to an output signal of said first detection means;
   (c) second detection means for detecting distortion in case said sinusoidal waves are distorted; and
   (d) a distortion preventing circuit for correcting said distortion and supplying sinusoidal waves to said converting elements in response to an output of said second detection means.

2. A driving circuit for a vibration wave motor in which AC signals are supplied to electromechanical energy converting elements to generate a travelling wave on a vibrating member thereby driving a movable member by means of said travelling wave, comprising:
   (a) periodic signal generating means for generating said periodic signals;
   (b) detection means for detecting the distortion in said periodic signals after the lapse of a determined period from the start of driving; and
   (c) adjusting means for adjusting the output of the AC signals from said periodic signal generating means in response to an output signal from said detection means.

3. A driving circuit according to claim 2, wherein said periodic signals are sinusoidal signals.

4. A driving circuit according to claim 2 or 3, wherein said detection means is adapted to detect a distortion in said sinusoidal signals, and said adjusting means is adapted to supply a correction signal to said periodic signal generating means to obtain sinusoidal periodic signals, when said detection means detects a distortion in the sinusoidal signals.

* * * * *

UNITED STATES PATENT AND TRADEMARK OFFICE
CERTIFICATE OF CORRECTION

PATENT NO. : 4,727,276                   Page 1 of 4

DATED : February 23, 1988

INVENTOR(S) : K. Izukawa, et al.

It is certified that error appears in the above-identified patent and that said Letters Patent is hereby corrected as shown below:

SHEET 1

Figure 3:
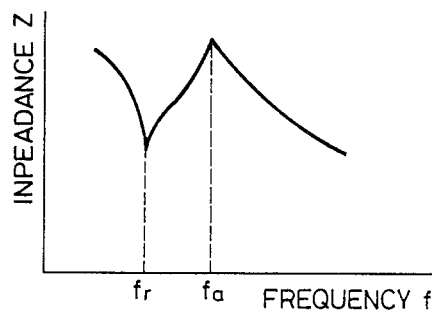
FIG. 3 is a chart showing the frequency-dependent impedance characteristic of a driving element.

Figure 3, "INPEADANCE Z" should read --IMPEDANCE Z--.

SHEET 6

Figure 8, "DIFFE-RENTER" should read --DIFFE-RENTIATER--

COLUMN 1

Line 18, "of foe" should read --of, for--, and "(PZT)" should read --(PZT),--.
Line 38, "of those" should read --to those--.
Line 63, "provided" should read --provided are--.

COLUMN 2

Line 1, "is" should read --of--.
Line 10, "said" should read --the--.
Line 63, "induces" should read --induce--.
Line 67, "a sudden change in the event" should read --the event of a sudden change in--.

UNITED STATES PATENT AND TRADEMARK OFFICE
CERTIFICATE OF CORRECTION

PATENT NO. : 4,727,276

DATED : February 23, 1988

INVENTOR(S) : K. Izukawa, et al.

It is certified that error appears in the above-identified patent and that said Letters Patent is hereby corrected as shown below:

COLUMN 4

Line 17, "an" should read --and the --.
Line 21, "diodes D1, D2" should read --diodes Di1, Di2--.
Line 48, "parallel to with" should read --in parallel with--.

COLUMN 5

Line 27, "allows" should be deleted.
Line 28, "to" should be deleted.

COLUMN 6

Line 15, "operational amplifier" should read --operational amplifier OP7--.
Line 49, "transistor Tr" should read --transistor Tr2--.

COLUMN 7

Line 8, "stage of drive" should read --driving stage--.
Line 48, "1a, 1can" should read --1a, 1b can--.

UNITED STATES PATENT AND TRADEMARK OFFICE
CERTIFICATE OF CORRECTION

PATENT NO. : 4,727,276
DATED : February 23, 1988
INVENTOR(S) : K. Izukawa, et al.

It is certified that error appears in the above-identified patent and that said Letters Patent is hereby corrected as shown below:

COLUMN 8

Line 10, "$\omega_X \cos(\omega_X \Theta), -\omega_X \sin(\omega_X \Theta)$" should read
--$\omega_X \cos(\omega_X \Theta), -\omega_X \sin(\omega_X \Theta)$--.
Line 28, "electro-striction" should read
--electrostriction--.
Line 48, "electro-striction" should read
--electrostriction--.

COLUMN 9

Line 15, "reisitors R12-R129" should read
--resistors R127-R129--.
Line 22, "power amplifier 16" should read
--power amplifier 116--.
Line 23, "power amplifier 17" should read
--power amplifier 117--.
Line 51, "control should read --controls--.
Line 62, "Zenar" should read --Zener--.

UNITED STATES PATENT AND TRADEMARK OFFICE
CERTIFICATE OF CORRECTION

PATENT NO. : 4,727,276

DATED : February 23, 1988

INVENTOR(S) : K. Izukawa, et al.

It is certified that error appears in the above-identified patent and that said Letters Patent is hereby corrected as shown below:

<u>COLUMN 10</u>

Line 35, "votage of FET," should read --voltage of the FET,--.

Signed and Sealed this

Twenty-second Day of August, 1989

Attest:

DONALD J. QUIGG

*Attesting Officer*     *Commissioner of Patents and Trademarks*